(12) United States Patent
Shepherd et al.

(10) Patent No.: US 7,979,376 B2
(45) Date of Patent: Jul. 12, 2011

(54) METHOD AND SYSTEM FOR ADDING PROCESSES TO PRINT PRODUCTION WORKFLOWS UTILIZING ASSET METADATA AND AUTOMATED REASONING

(75) Inventors: Michael David Shepherd, Ontario, NY (US); Dale Ellen Gaucas, Penfield, NY (US); Kirk J. Ocke, Ontario, NY (US)

(73) Assignee: Xerox Corporation, Norwalk, CT (US)

(*) Notice: Subject to any disclaimer, the term of this patent is extended or adjusted under 35 U.S.C. 154(b) by 833 days.

(21) Appl. No.: 11/986,904

(22) Filed: Nov. 27, 2007

(65) Prior Publication Data

US 2009/0138424 A1 May 28, 2009

(51) Int. Cl.
*G06F 17/00* (2006.01)
*G06N 5/02* (2006.01)

(52) U.S. Cl. .......................................................... 706/47

(58) Field of Classification Search ...................... 706/47
See application file for complete search history.

(56) References Cited

U.S. PATENT DOCUMENTS

| | | | | |
|---|---|---|---|---|
| 6,407,820 B1 * | 6/2002 | Hansen et al. | ............... | 358/1.12 |
| 6,411,314 B1 * | 6/2002 | Hansen et al. | ............... | 715/769 |
| 6,462,756 B1 * | 10/2002 | Hansen et al. | ............... | 715/764 |
| 6,509,974 B1 * | 1/2003 | Hansen | ............... | 358/1.12 |
| 6,995,860 B2 * | 2/2006 | Roztocil et al. | ............... | 358/1.18 |
| 7,003,723 B1 * | 2/2006 | Kremer et al. | ............... | 715/234 |
| 7,012,706 B1 * | 3/2006 | Hansen | ............... | 358/1.15 |
| 7,072,057 B1 * | 7/2006 | Hansen | ............... | 358/1.15 |
| 7,242,302 B2 * | 7/2007 | Rai et al. | ............... | 340/572.1 |
| 7,375,842 B2 * | 5/2008 | Kloosterman et al. | ....... | 358/1.18 |
| 7,515,295 B2 * | 4/2009 | Kremer et al. | ............... | 358/1.18 |
| 7,839,511 B2 * | 11/2010 | La Rosa Ducato et al. | . | 358/1.13 |

OTHER PUBLICATIONS

A better climate for Britain's industry, Weinstein, Caroline; Electronics and Power vol. 23 , Issue: 8 Digital Object Identifier: 10.1049/ep. 1977.0359 Publication Year: 1977 , pp. 624-630.*
Syntax and semantics in a distributed speech understanding system, Hayes-Roth, F.; Mostow, D.; Acoustics, Speech, and Signal Processing, IEEE International Conference on ICASSP '76. vol. 1 Digital Object Identifier: 10.1109/ICASSP.1976.1170046 Publication Year: 1976 , pp. 421-424.*
Discovering Batch Processing Area from Workflow Logs, Yiping Wen; Jianxun Liu; Zhigang Chen; Computational Science and Engineering (CSE), 2010 IEEE 13th International Conference on Digital Object Identifier: 10.1109/CSE.2010.61 Publication Year: 2010 , pp. 410-414.*
Supporting information extraction from printed documents by Lexico-Semantic pattern matching, Wenzel, C.; Document Analysis and Recognition, 1997., Proceedings of the Fourth International Conference on vol. 2 Digital Object Identifier: 10.1109/ICDAR.1997. 620605 Publication Year: 1997 , pp. 732-735 vol. 2.*

* cited by examiner

*Primary Examiner* — Michael Holmes
(74) *Attorney, Agent, or Firm* — Kermit D. Lopez; Luis M. Ortiz; Ortiz & Lopez, PLLC

(57) ABSTRACT

A method and system for adding processes to print production workflows utilizing asset metadata and automated reasoning system is disclosed. The asset metadata can be extracted from the resources associated with a print product description such as PDF files and image and artwork files. The asset metadata can be processed through an automated reasoning system in order to infer additional metadata. The inferred metadata can be utilized to add and parameterize a process node in order to build a more effective and useful process network. The reasoning system can be a rule based reasoning system and/or ontology based reasoning system.

20 Claims, 6 Drawing Sheets

| JDF PRODUCT INTENT TO INFERRED METADATA | | |
|---|---|---|
| JDF PRODUCT INTENT 310 | ASSET METADATA 220 | INFERRED METADATA 260 |
| JDF #1 | GOLF TOURNAMENT | OUTDOOR EVENTS |
| JDF #2 | FATHER | PERSON |
| JDF #3 | IMAGE RESOLUTION 72 DPI | LOW RESOLUTION |

300

OK 330  CANCEL 340

FIG. 3

METHOD AND SYSTEM FOR ADDING PROCESSES TO PRINT PRODUCTION WORKFLOWS UTILIZING ASSET METADATA AND AUTOMATED REASONING

TECHNICAL FIELD

Embodiments are generally related to data processing methods and systems. Embodiments are related to an intent to process conversion system and also relate to print process descriptions. Embodiments are additionally related to methods and systems for adding processes to print production workflows using asset metadata and automated reasoning.

BACKGROUND OF THE INVENTION

JDF (Job Definition Format) is an open, extensible, XML-based print workflow specification framework. It ties together authoring, production, management, manufacturing, delivery, and MIS (Management Information System) control. The intent to process conversion translates a JDF job definition of the product intent into a JDF process specification for specifying the manufacturing of the print product. The product description captures the customer's product intent6t by describing the desired print product. Product description formats, such as JDF product intent nodes, are intended to formalize the description of a print product to make translation to a workflow easier.

The JDF product intent defines the product description of the final product to be produced by the production shop. The product description consists of intent parameters of product characteristics for example binding, color models, finished size and references to artwork content such as PDLs and supporting data files such as images, fonts, profiles, etc. The JDF intent to process conversion system transforms the intent description into a JDF process network of process nodes, and specifies dynamic process parameters of each process node for execution by a workflow system. The process networks in combination with static process parameters set on specific workflow applications in the workflow system result in a fully populated workflow specification for the print shop.

Since such constructs are not typically meant to be human-readable, their use can be complicated and prone to error. Prior art methods for adding processes to print production workflows are therefore based on manual or improvised approaches, which cannot reliably and accurately provide the most appropriate translation into a workflow and which, therefore, result in inefficient and time consuming processes. There is a need to provide a methodology for adding processes into an automatically generated print shop process network which makes translation of the product description to workflow easier.

Based on the foregoing it is believed that a need exists for an improved method for adding processes to print production workflows utilizing an asset metadata and automated reasoning system. Additionally, a need exists for providing a methodology, which enables print product descriptions to be effectively and rapidly transformed into a desired end product.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing method and system.

It is another aspect of the present invention to provide for improved intent to process conversion system.

It is a further aspect of the present invention to provide for an improved method and system for automatically adding new processes to print production workflows.

The aforementioned aspects and other objectives and advantages can now be achieved as described herein. A method and system for adding processes to print production workflows utilizing asset metadata and automated reasoning system is disclosed. The asset metadata can be extracted from the resources associated with a print product description such as PDF files and image and artwork files. The asset metadata can be processed through an automated reasoning system in order to infer additional metadata and asserted into facts as input into the translation of product intent to a workflow. The inferred metadata can be utilized to add and parameterize a process node in order to build more effective and useful process network. The reasoning system can be a rule based reasoning system and/or ontology based reasoning system.

The reasoning system is assumed to be rules-based, but other reasoning systems, such as a knowledge base intent system utilizing semantic web technology, and specifically automated reasoning are equally applicable. The system can be provided with product descriptions, for example, a set of JDF product intent files that all represent the same product type. The product description contains references to artwork resources such as PDLs (Page Description Language), images, font files, variable data, etc. The PDLs themselves may contain images or other resource references, which contain asset metadata. The metadata can be extracted from the resources and asserted into facts. In the rules-based reasoning system, the metadata characteristics are related to the preconditions of the various classification rules. In the semantic web based reasoning system, the metadata characteristics are defined in an ontology of metadata, which specifies logic-based property restrictions on the metadata concepts.

In accordance with additional features of the present invention, modules can be adapted for automatically adding process nodes to print production workflows to infer knowledge from asset metadata tags and use said knowledge during process network generation via a module adapted to provide a print product description, a module adapted to extract asset metadata from a plurality of resources associated with said print product description and a module adapted to utilize said inferred metadata to add and parameterize a process node including said inferred metadata to a process network. A processor associated with the system can be adapted to process said asset metadata through said automated reasoning system to infer predefined characteristics from said asset metadata to form inferred metadata.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 3 illustrates an exemplary embodiment of a visualized knowledge-base illustrating JDF product intent to inferred metadata utilizing a reasoning system, in accordance with another feature of the present invention;

DETAILED DESCRIPTION

Figure 1:
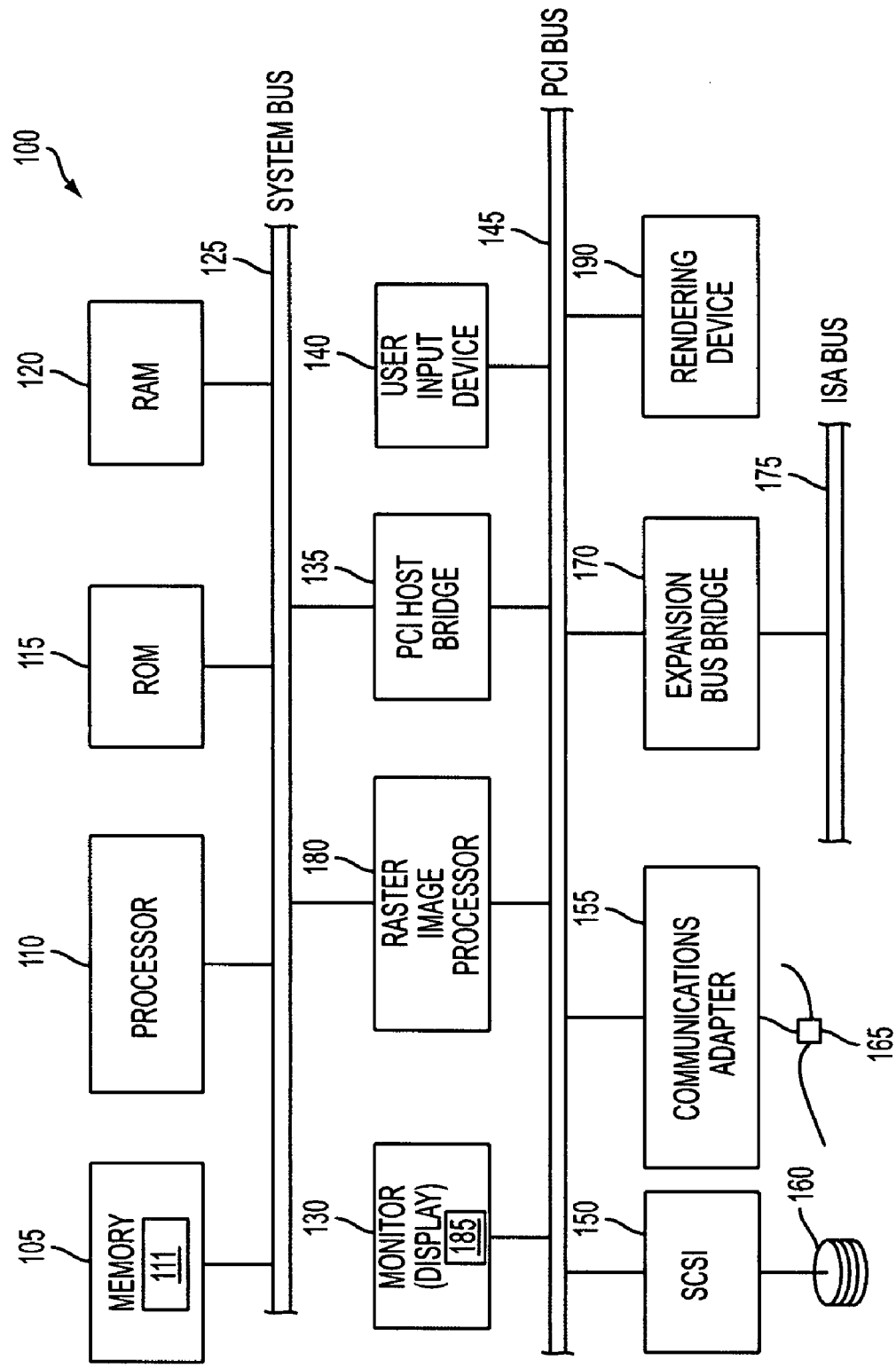
FIG. 1 illustrates a block diagram of a data-processing apparatus, which can be utilized for adding processes to print production workflows, in accordance with a feature of the present invention.

The particular values and configurations discussed in these non-limiting examples can be varied and are cited merely to illustrate at least one embodiment and are not intended to limit the scope thereof.

DEFINITIONS

Intent2Process: The automatic conversion of a formal print product description, such as JDF Intent, into a Process Network (workflow) that can be used to manufacture the desired product. Intent2Process technology is currently deployed in the FreeFlow product suite.

JDF: The Job Definition Format. A formal language that describes both print products and the processes required for creating print products. Specifically JDF describes print products and their manufacturing processes used in print shops.

JDF Process: A set of processing instructions sufficient to describe the details of a particular process step. Examples of JDF Process Nodes are: Digital Printing, Imposition, Stitching, (a set of processing instructions).

JDF Product Intent (JDF Intent): A formal description of a print product such as a Book, Business Card or Brochure. (more generally, a Product Description).

Product Description: A print product described using a formal unambiguous vocabulary. An example of a product description vocabulary is the JDF Product Node.

Processing Instructions: Instructions sufficient to execute a particular process. An example of processing instructions is the Process Node construct in JDF.

Process Network: A set of processing instructions that when executed in the order specified by the process network results in a print product. A process network is synonymous with a workflow.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module that can embody features of the present invention is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 2-3 can, for example, be implemented in the context of such a software module.

Referring to the drawings and in particular to FIG. 1, there is depicted a data-processing apparatus 100 which can be utilized for adding processes to print production workflows using asset metadata and automated reasoning. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a processor (CPU) 110, a Read-Only memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 includes software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to PCI (Peripheral Component Interconnect) bus 145. Module 111 can be adapted for automatically adding process nodes to print production workflows to infer knowledge from asset metadata tags and use said knowledge during process network generation via a module adapted to provide a print product description, a module adapted to extract asset metadata from a plurality of resources associated with said print product description and a module adapted to utilize said inferred metadata to add and parameterize a process node including said inferred metadata to a process network. Processor 110 can be adapted to process said asset metadata through said automated reasoning system to infer predefined characteristics from said asset metadata to form inferred metadata.

Data-process apparatus 100 can thus include CPU 110, ROM 115, RAM 120, and a rendering device 190 (e.g., printer, copier, scanner, etc.), which are also coupled to a PCI (Peripheral Component Interconnect) local bus 145 of data-processing apparatus 100 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, a small computer system interface (SCSI) 150, a raster image processor (RIP) 180, and an expansion bus-bridge 170 can also be attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 can provide standard software routines (e.g., module 111) to handle these elements and reports the user's actions.

In this regard, a user actuates the appropriate keys on the user interface 185 to adjust the parameters of a print job. A user can access and operate the rendering device 190 using the user interface 185. The reasoning system can be a software module such as, for example, the module 111 of apparatus 100 depicted in FIG. 1. The reasoning system is assumed to be rules-based and ontology based reasoning system utilizing semantic web technology. Considering the fact that a product description must always be transformed into a set of processing instructions in order to actually create the described product, one of the pre-requisites for the automated conversion of intent to process is a well-defined product description. An example is JDF product intent. The system starts with asset metadata and reasoning system for adding processes to print production workflows.

Figure 2:
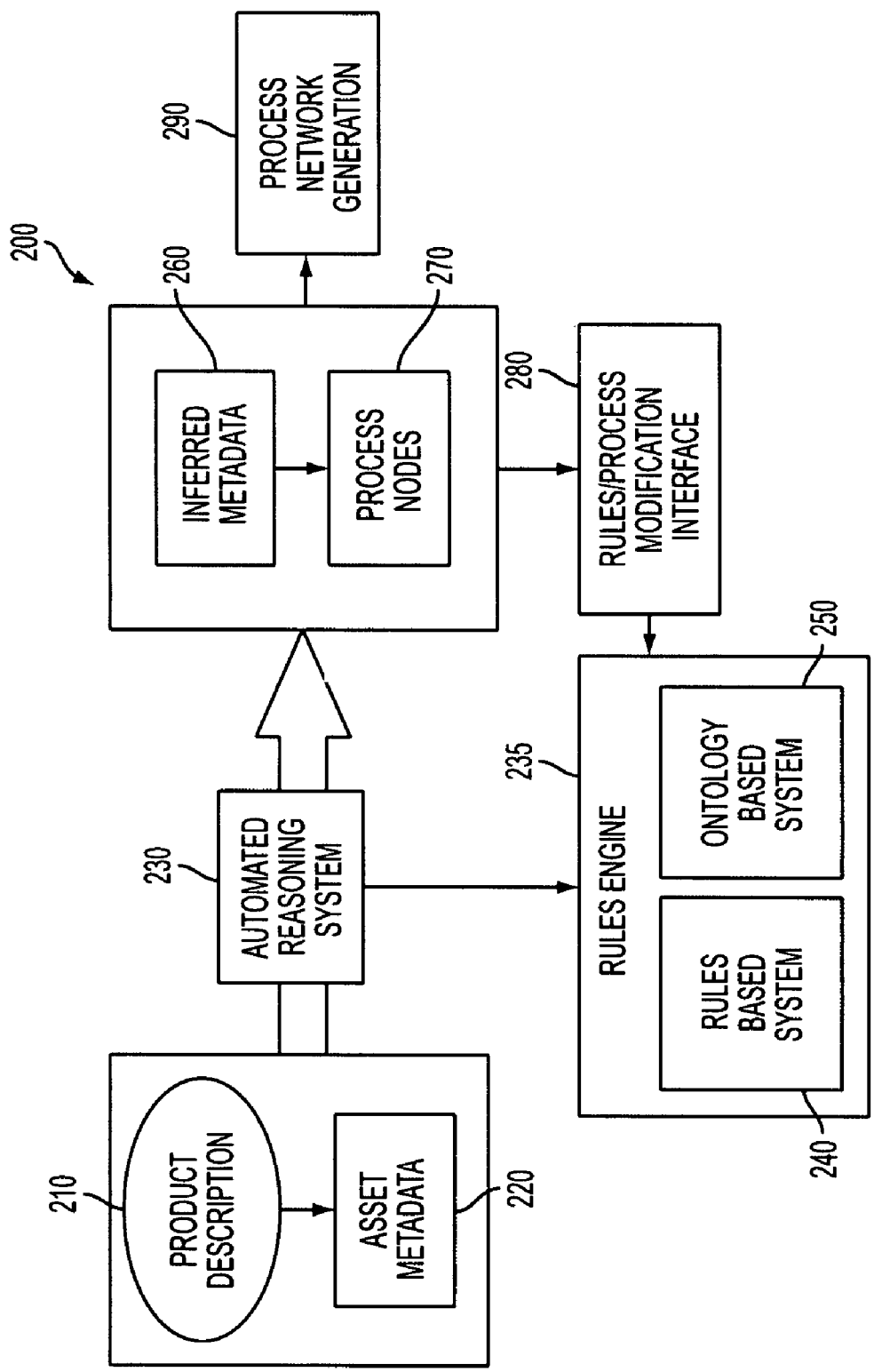
FIG. 2 illustrates a block diagram of the overall workflow for adding processes to print production workflows, in accordance with another feature of the present invention.

Referring to FIG. 2 block diagram 200 of the overall workflow for adding processes to print production workflow is illustrated, in accordance with a feature of the present invention. The print product description 210 can be in the form of job definition format (JDF) product nodes for describing products and processes used in print shops. The product description 210 consists of intent parameters of product characteristics for example binding, color models, finished size and references to artwork content such as PDLs and supporting data files such as images, fonts, profiles, etc. These characteristics contain metadata and can be extracted as raw metadata or asset metadata 220. The asset metadata 220 can be categorized using an automated reasoning system 230. The asset metadata 220 extracted from the product description 210 can be loaded into the rules-engine 235 so as to assert the asset metadata 220 within the rules engine 235.

The rules engine 235 can be classified into rules based system 240 and ontology based system 250. The reasoning of ontology-based system 250 can be done using description logics or other higher-order logics. The rules engine 235 makes its classification based on the final state of the output component facts, which are modified by rules firing regarding the input component facts. The inferred metadata 260 can be refined or extended to generate process nodes 270. The process networks are built from process nodes 270 and populated with parameters based on the asserted facts from the product description 210. Similarly, the facts asserted from the asset metadata 220 can be used to add and parameterize process nodes 270. The system may prompt the user for verification of the categorized asset metadata 220 characteristics and the addition of process nodes 270 through a rules/process modification interface 280.

The process nodes 270 can be utilized for process network generation 290. For example, the product description 210 may reference a PDF file. The PDF file may include an XMP-based tag that labels a JPEG component, for example such as a "golf tournament", as asset metadata 220. During process node creation, a "photograph subject ontology" can be utilized by the automated reasoning system 230 in order to classify the image as "outdoors" and a color management pre-press node can be added which uses an appropriate color profile for the image taken in outdoor conditions.

Referring to FIG. 3 an exemplary embodiment of a graphical view of a knowledge-base 300 illustrating JDF product intent to inferred metadata using reasoning system is illustrated, in accordance with a feature of the present invention. The knowledge-base 300 includes asset metadata 220 of JDF product intent files 310 (such as Image of Golf Tournament) and its asset metadata ontology 220 (such as using an ontology of photograph subjects containing knowledge about Outdoor Events). The asset metadata 220 can be processed through an automated reasoning system 230 to form inferred metadata 260. The inferred metadata is then used to determine the process in which to add in the translation of the product intent into a workflow (such as color management for outdoor conditions).

Figure 4:
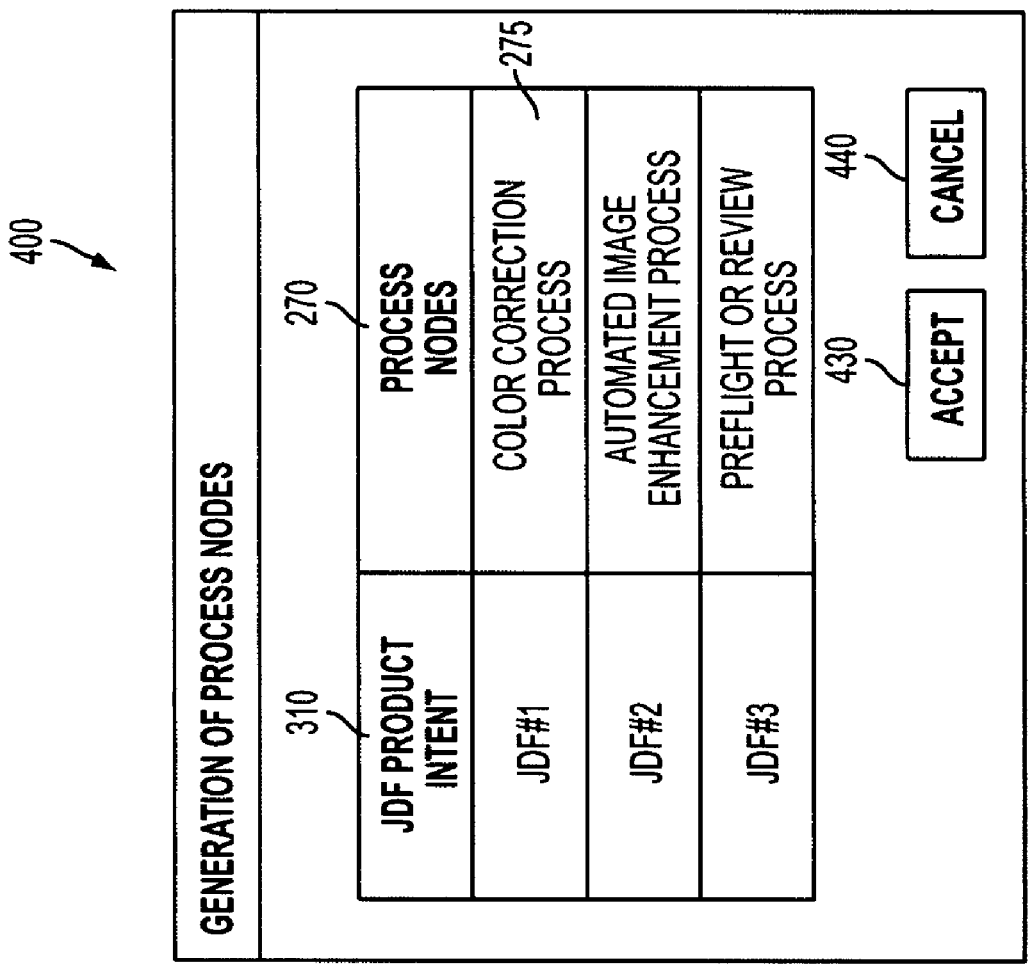
FIG. 4 illustrates an exemplary embodiment of a visualized knowledge-base interface illustrating generation of process nodes, in accordance with another feature of the present invention.

Referring to FIG. 4 an exemplary embodiment of a graphical view knowledge-base 400 illustrating generation of process nodes is illustrated, in accordance with a feature of the present invention. The knowledge-base 400 includes the JDF intent 310 and related process nodes 270. For example, as illustrated in FIG. 3 the asset metadata 220 indicates that an image is a golf tournament, and a golf tournament can be classified as an outdoor activity utilizing the automated reasoning system 230, and therefore a color correction process can be included that does outdoor color correction.

Another example provides that the asset metadata 220 indicates that an image is a father, and a father can be classified as a person, then an automated image enhancement process for red eye correction could be included that supports images of people's faces. Furthermore, the asset metadata 220 indicate that an image has a resolution of 72 dpi, and any resolution less than 150 dpi can be classified as 'low resolution'. A preflight and/or review process can be included that ensures poor images are caught early in the workflow. The interface 280 provides that the user can accept or reject the process nodes 270 as suggested by the inference of the rule and/or knowledge-base for inclusion in the workflow.

Figure 5:
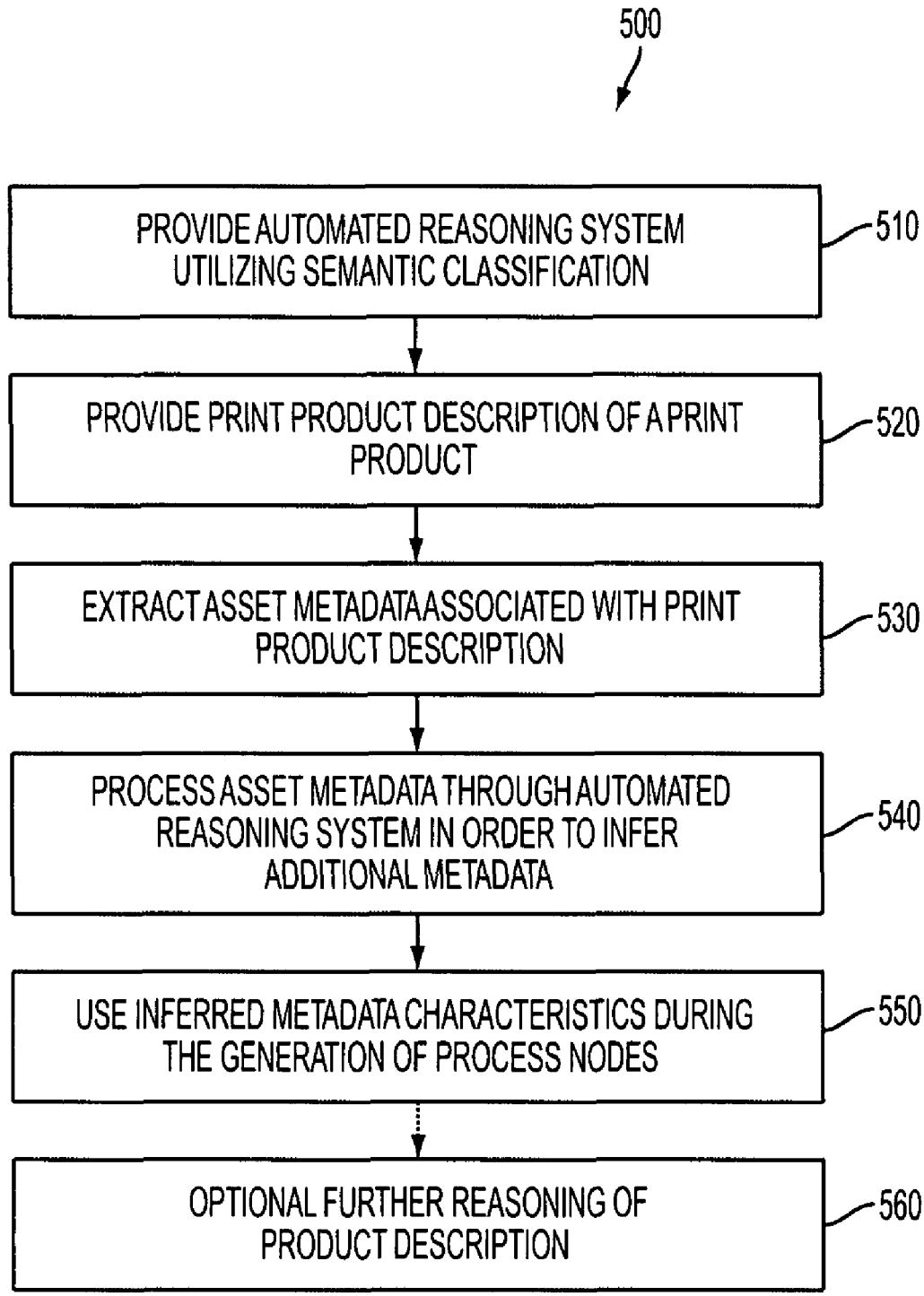
FIG. 5 illustrates a high level flow chart of operations illustrating logical operational steps of a method for adding processes to print production workflows using asset metadata and automated reasoning, in accordance with another feature of the present invention.

Referring to FIG. 5 a high level flow chart of operations illustrating logical operational steps of a method 500 for adding processes to print production workflows using asset metadata and automated reasoning is illustrated, in accordance with a feature of the present invention. A reasoning system based on semantic classification can be provided, as shown at block 510. The semantic classification includes rules based system and ontology based system. The print product description of a print product can be provided, as illustrated at block 520. The raw metadata stored in print product description can be extracted, as shown at block 530. The raw metadata can be processed through automated reasoning system in order to infer additional metadata, as shown at block 540. The inferred metadata characteristics can be used during the generation of process nodes, as indicated at block 550. As shown in block 560, further reasoning of products descriptions can be undertaken consistent with execution of the previous steps.

The JDF product node is a formal, rigorous, description of a product such as a book, a business card or a brochure. However, as already indicated above, the print product description can be any formal unambiguous vocabulary which describes the print product. Similarly, asset metadata uses a vocabulary, for example, asset tags may use a vocabulary based on an ontology created by using tools such as the Xerox Generic Visual Categorizer or WordNet. Ontologies can also be developed from manual image tagging with keywords. Raw tags from the metadata can be processed through automated classification to determine additional information to be used by intent to process.

Figure 6:
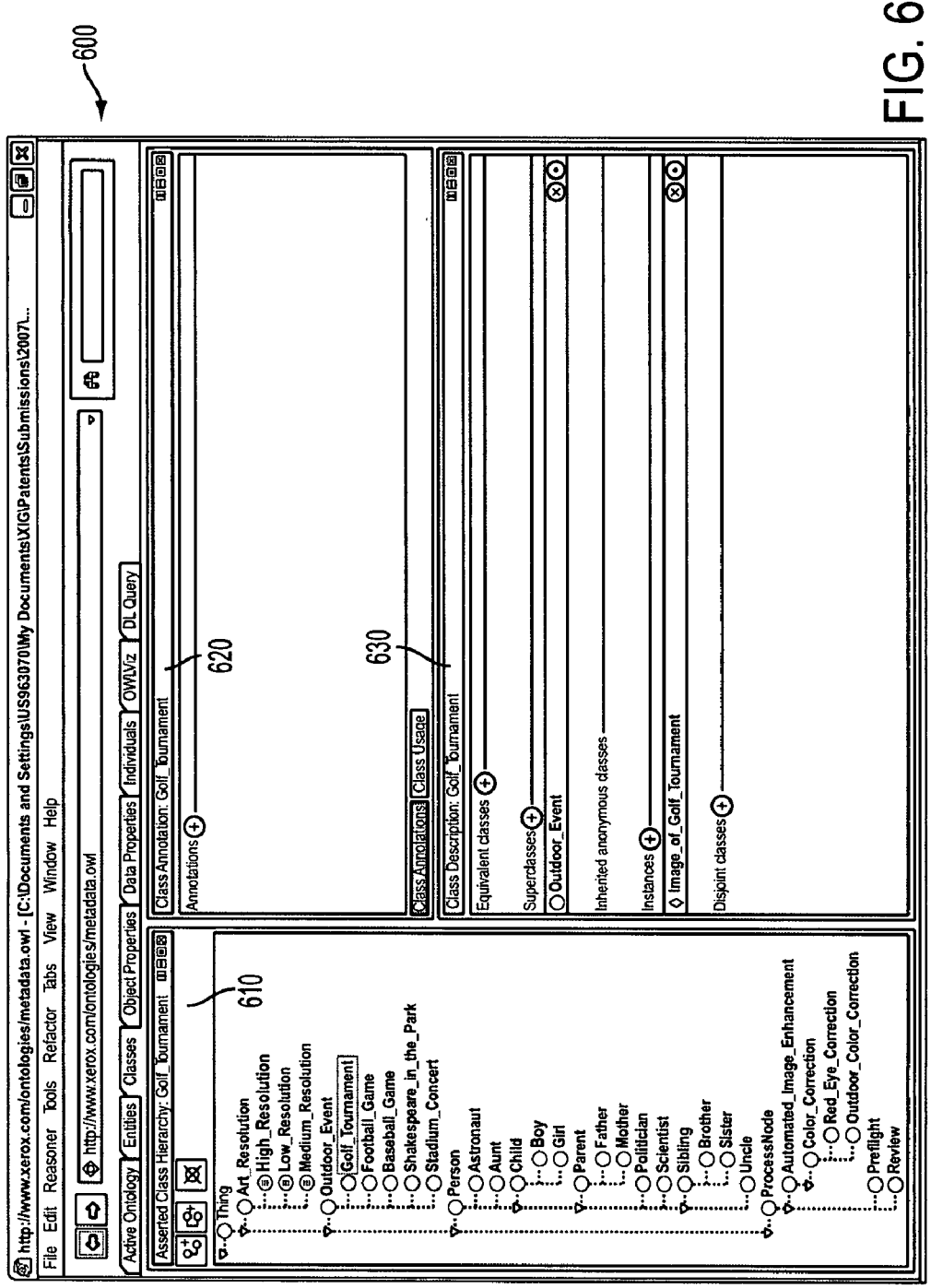
FIG. 6 illustrates an exemplary screen shot of an interface representing aspects of the present invention in a format that can be viewed by a user.

For example, if an image is tagged with the term 'father', the automated reasoning system 230 can use one or more ontologies to infer additional tags for the image such as 'male', 'person', and 'adult'. Raw metadata 220 and inferred metadata 260 as shown in FIG. 2 are then used to reason about image enhancement procedures that can be incorporated into the process nodes. For instance, this method can be configured to recognize the tag 'person' and add a process for flesh-tone color correction on artwork with content including people. The asset metadata 220 can include the tag 'father', but semantic-based automated reasoning is used to infer that tags such as 'father', 'boy', 'uncle', 'scientist', etc. are types of people, and therefore this method can add and parameterize process nodes as desired. Referring to FIG. 6, an exemplary screen shot 600 of an interface showing data fields including an asset class hierarchy 610, class annotations 620 and class description 630. In the screen shot, a "Golf Tournament" is illustrated as the example of a type of "Outdoor Event."

Based on the foregoing it can be appreciated that a system can be provided, through the use of one or more software modules as described above, which results in adding process description into print production workflows utilizing asset metadata and automated reasoning system. The main advantage of this method is that it will automatically add a process node by utilizing ontology-based or rule-based systems to infer knowledge from asset metadata tags and then use such knowledge during process network generation. This method allows the intent to process conversion to more effectively add a process and parameterize a process. Time is also saved because there is no need for administration support to manually add process nodes based on asset content.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically adding process nodes to print production workflows by inferring knowledge from asset metadata tags and using said knowledge during process network generation, comprising:
    providing a print product description;
    extracting asset metadata from a plurality of resources associated with said print product description;
    processing said asset metadata through an automated reasoning system in order to infer relevant information from said asset metadata to form inferred metadata; and
    utilizing said inferred metadata to add and parameterize a process node to a process network.

2. The method of claim 1 wherein said automated reasoning system further comprises rules-based reasoning.

3. The method of claim 2 wherein said rules-based reasoning further comprises a pre-condition of a plurality of classification rules.

4. The method of claim 1 wherein said automated reasoning system further comprises ontology-based reasoning.

5. The method of claim 4 wherein said ontology-based reasoning further comprises characteristics ontology represented by description logics.

6. The method of claim 1, wherein said automated reasoning further comprises a user interface and a module operable to prompt a user to add said process node to said process network.

7. The method of claim 1 wherein said automated reasoning automatically utilizes a predefined set of characteristics to add said process node to said process network.

8. The method of claim 1, wherein said product description comprises Job Definition Format (JDF) product intent nodes adapted for describing products and processes used in print shops.

9. A method for automatically adding process nodes to print production workflows by inferring knowledge from asset metadata tags and using said knowledge during process network generation, comprising:
    providing a print product description;
    extracting asset metadata from a plurality of resources associated with said print product description;
    processing said asset metadata through an automated reasoning system to infer predefined characteristics from said asset metadata to form inferred metadata; and
    utilizing said inferred metadata to add and parameterize a process node to a process network.

10. The method of claim 9 wherein said automated reasoning system further comprises rules-based reasoning.

11. The method of claim 10 wherein said rules-based reasoning further comprises at least one pre-condition extracted from a plurality of classification rules.

12. The method of claim 9 wherein said automated reasoning system further comprises ontology-based reasoning.

13. The method of claim 12 wherein said ontology-based reasoning further comprises characteristics ontology represented by description logics.

14. The method of claim 9, wherein said automated reasoning system further comprises a knowledge-base for adding said process node to said process network.

15. The method of claim 9 wherein said automated reasoning system automatically utilizes said predefined set of characteristics to add said process node to said process network.

16. The method of claim 9, wherein said automated reasoning system further comprises a knowledge-base for adding asset metadata definitions to a metadata ontology.

17. An automated reasoning system adapted for automatically adding process nodes to print production workflows by inferring knowledge from asset metadata tags and using said knowledge during process network generation, said automated reasoning system comprising:
    a module adapted to provide a print product description;

a module adapted to extract asset metadata from a plurality of resources associated with said print product description;

a processor adapted to process said asset metadata through said automated reasoning system to infer predefined characteristics from said asset metadata to form inferred metadata; and a module adapted to utilize said inferred metadata to add and parameterize a process node including said inferred metadata to a process network.

18. The automated reasoning system of claim 17 further comprising a rules-based reasoning module.

19. The automated reasoning system of claim 18 wherein said rules-based reasoning module is adapted to extract at least one pre-condition from a plurality of classification rules.

20. The automated reasoning system of claim 17 further comprising an ontology-based reasoning module adapted to reference ontology characteristics via description logic.

* * * * *